United States Patent [19]

Ishii

[11] Patent Number: 5,361,066
[45] Date of Patent: Nov. 1, 1994

[54] DATA PROCESSING DEVICE USING DATA CORRELATION

[75] Inventor: Yoshiki Ishii, Yokohama, Japan

[73] Assignee: Canon Kabushiki Kaisha, Tokyo, Japan

[21] Appl. No.: 190,577

[22] Filed: Feb. 2, 1994

Related U.S. Application Data

[63] Continuation of Ser. No. 84,077, Jun. 28, 1993, abandoned, which is a continuation of Ser. No. 691,494, Apr. 25, 1991, abandoned.

[30] Foreign Application Priority Data

Apr. 27, 1990 [JP] Japan .................. 2-113956
Apr. 27, 1990 [JP] Japan .................. 2-113957

[51] Int. Cl.⁵ ............................................. H03M 7/36
[52] U.S. Cl. ................................. 341/58; 341/50
[58] Field of Search .............................. 341/50, 58

[56] References Cited

U.S. PATENT DOCUMENTS

| | | | |
|---|---|---|---|
| 4,456,905 | 6/7198 | Odaka | 341/58 |
| 4,885,637 | 12/1989 | Shikakura et al. | |
| 4,903,124 | 2/1990 | Hoshi et al. | 358/133 |
| 4,953,019 | 8/1990 | Skikakura et al. | 358/133 |
| 5,023,715 | 6/1991 | Owada et al. | 358/133 |
| 5,043,809 | 8/1991 | Shikakura et al. | 358/133 |
| 5,067,010 | 11/1991 | Ishii et al. | 358/13 |
| 5,070,402 | 12/1991 | Ishii et al. | 358/135 |
| 5,151,699 | 9/1992 | Moriyama | 341/58 |
| 5,166,958 | 11/1992 | Shimokoriyama et al. | 375/37 |
| 5,204,740 | 1/1993 | Ishii | 358/105 |

Primary Examiner—Howard L. Williams
Attorney, Agent, or Firm—Fitzpatrick, Cella, Harper & Scinto

[57] ABSTRACT

A plurality of (n−p)-bit non-correlation data having no correlation between data each are added with a common p-bit data to thereby obtain a plurality of n-bit data having data correlation. The plurality of n-bit correlation data are processed using data correlation therebetween so that even a data train having no correlation can be processed effectively. A plurality of m-bit non-correlation data having no correlation between data are separated into a plurality of blocks including (n−p)-bit data and n-bit data. A p bit among the separated n-bit data is added to the separated (n−p)-bit data to thereby obtain a plurality of n-bit data having data correlation, in both cases n and m being an integer more than 2 and p is an integer smaller than n.

17 Claims, 8 Drawing Sheets

DATA PROCESSING DEVICE USING DATA CORRELATION

This application is a continuation of application Ser. No. 08/084,077 filed Jun. 28, 1993, now abandoned, which is a continuation application Ser. No. 07/691,494 filed Apr. 25, 1991, abandoned.

BACKGROUND OF THE INVENTION

1. Field of the Invention

The present invention relates to a data processing device, and more particularly to a data processing device for processing data using correlation between data.

2. Related Background Art

There has been recently proposed a system for digitally recording audio signals or video signals in a recording medium. Very low frequency and d.c. components are difficult to be recorded in or reproduced from a magnetic recording medium so that a recording-/modulating method such as an 8-10 block coding has been used in which a code train not including d.c. components is extracted. As a recording/modulating method of suppressing d.c. and low frequency components of a code train, there has been proposed a coding method wherein a combination of a plurality of data having high correlation is assigned a digital code having a total number of bits same as that of the plurality of data and having less d.c. and low frequency components, thereby allowing recording with less d.c. components without increasing redundancy. In this specification, the coding method of suppressing d.c. and low frequency components using correlation between input data is called a d.c. suppression coding method.

In recording an image (still image or moving image) in a recording medium, additional information, e.g. ID information, specific to each image is added. Such additional information has no or less correlation between data so that the above-described d.c. suppression coding method has been used. As a result, there is high possibility of assigning a code containing much d.c. components thereby resulting in a hardship of recording/reproducing.

SUMMARY OF THE INVENTION

It is therefore an object of the present invention to solve the above-described problems.

It is another object of the present invention to provide a data processing device capable of processing data having no correlation in a same manner as processing data having correlation.

In view of the above objects, an embodiment of the present invention provides a data processing device, comprising:

(a) input means for inputting a plurality of non-correlation data having no correlation between data, the plurality of non-correlation data each being constructed of an (n−p) bit where n is an integer more than 2 and p is an integer smaller than n;

(b) means for adding a common p bit data to each of the plurality of non-correlation data; and (c) means for processing a plurality of n bit data outputted from the adding means, using correlation between the plurality of n-bit data.

It is a further object of the present invention to provide a data processing device capable of processing, by using a simple circuit, a data sequence mixed with data having correlation and data having no correlation.

In view of the above object, an embodiment of the present invention provides a data processing device, comprising:

(a) first input means for inputting a plurality of non-correlation data having no correlation between data, the plurality of non-correlation data each being constructed of an (n−p) bit where n is an integer more than 2 and p is an integer smaller than n;

(b) means for adding a common p bit data to each of the plurality of non-correlation data;

(c) second input means for inputting a plurality of n-bit correlation data having correlation between data; and (d) switching means for selectively outputting either the plurality of n-bit correlation data or a plurality of n-bit data outputted from the adding means.

The above and other objects and advantages of the present invention will become apparent from the following detailed description of the embodiments when read in connection with the accompanying drawings.

DETAILED DESCRIPTION OF THE PREFERRED EMBODIMENTS

The embodiments of the present invention will be described with reference to the accompanying drawings.

Figure 1:
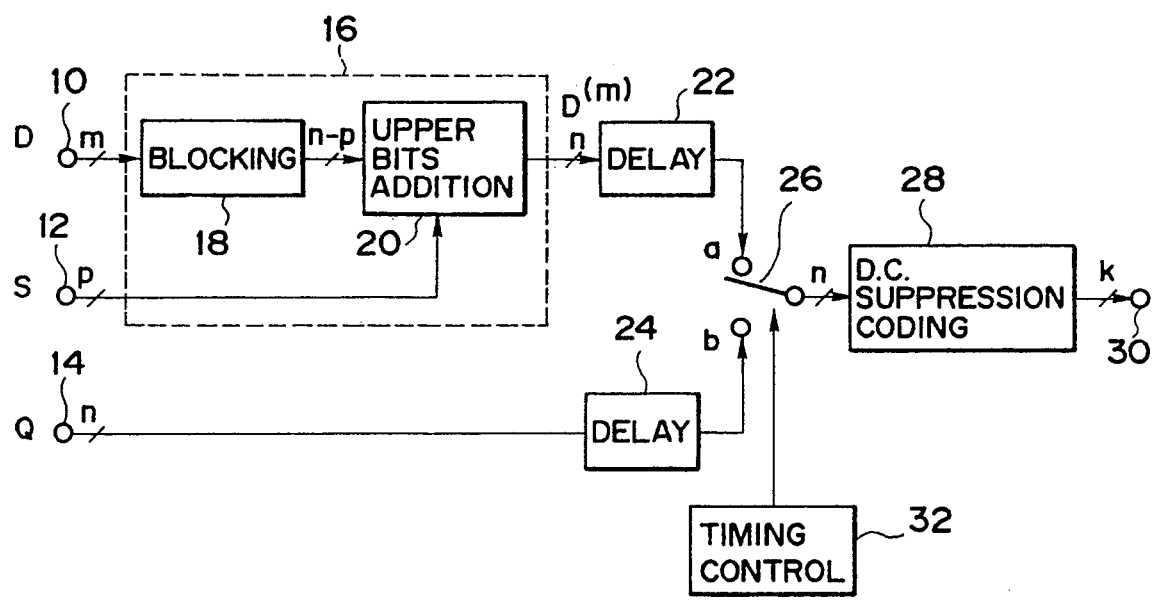
FIG. 1 is a block diagram showing the structure of a data processing device according to an embodiment of the present invention.

FIG. 1 is a block diagram showing a data processing device according to an embodiment of the present invention. Reference numeral 10 represents an input terminal for an m bit non-correlation data D, which is composed of a number of blocks of m bit data, each of the m bit data blocks having little or no correlation with the other blocks reference numeral 12 represents an input terminal for a p bit staff data S which will be detailed later, and reference numeral 14 represents an input terminal for an n bit correlation data Q, which is composed of a number of m bit sampled data, where adjacent sampled data are correlated with each other.

Reference numeral 16 represents a block correlation generation unit for converting an m-bit non-correlation data D into an n-bit correlation data, reference numeral 18 represents an (n−p) bit blocking circuit, and reference numeral 20 represents an upper bit addition circuit for adding the staff data S at the input terminal 12 as the upper bits of an output of the blocking circuit 18. Reference numerals 22 and 24 represent a delay circuit for timing adjustment, reference numeral 26 represents a switch operating as a multiplier circuit, reference numeral 28 represents a d.c. suppression coding circuit, reference numeral 30 represents an output terminal, and reference numeral 32 represents a timing control circuit for controlling the switch 26.

The operation of the data processing device shown in FIG. 1 will be described. The blocking circuit 18 blocks the non-correlation data D at the input terminal 10 into an (n−p) bit data group. The upper bit addition circuit 20 adds a p bit staff data S at the input terminal 12 as the upper bits of the (n−p) bit data from the blocking circuit 18. An output of the blocking correlation generation unit 16, i.e., an output of the upper bit addition circuit 20, is an n bit blocked data $D^{(m)}$.

Figure 4:
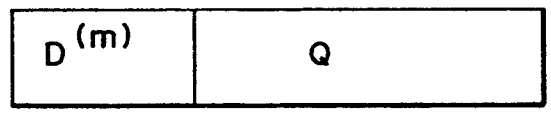
FIG. 4 shows the format of data outputted from the switch shown in FIG. 3.

An output from the block correlation unit 16 and the input data D at the input terminal 14 are delayed by the delay circuits 22 and 24, respectively, and applied to the contacts a and b of the switch 26. The switch 26 is actuated by a timing signal from the timing control circuit 32, so that the data $D^{(m)}$ and Q are inputted to the d.c. suppression coding circuit 28 in the order, e.g., as shown in FIG. 4.

A series of n-bit data inputted to the d.c. suppression coding circuit 28 has data correlation therebetween. The d.c. suppression coding circuit 28 encodes a series of n-bit data $D^{(m)}$ and Q multiplexed by the switch 26 into a k-bit code having less d.c. and low frequency components, in accordance with an 8—8 word invert coding method of suppressing d.c. and lower frequency components, and outputs it from the output terminal 30. As the d.c. suppression coding circuit 28, a coding circuit may be used which is disclosed in U.S. Pat. No. 4,885,637 and uses a mapping coder and the like for converting a combination of two 2-bit data into 2n-bit data having less d.c. and low frequency components.

Figure 2:
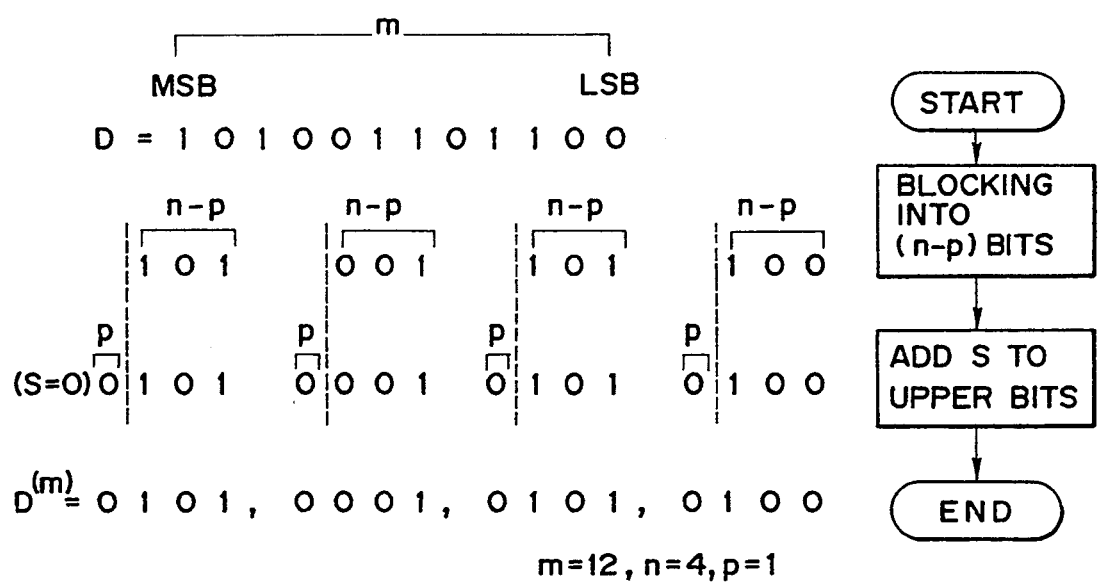
FIG. 2 is a diagram used for explaining the processing contents of the block correlation generation unit shown in FIG. 1.

Next, the method of determining the staff data S will be described with reference to FIG. 2. FIG. 2 shows an example of the processing flow and contents of the correlation generation unit 16. In this example, m=12, n=4, and p=1. The staff data S is set as S=0. The blocking circuit 18 divides the 12-bit non-correlation data D into four 3 (=n−p)-bit blocks. The upper bit addition circuit 20 adds the staff data S (=0) as the upper bit of respective 3-bit blocks, and outputs 4-bit blocked data $D^{(m)}$. The upper bit of each data $D^{(m)}$ has a common upper bit S. The range of data becomes $\frac{1}{2}$ narrower than the case where the 12-bit non-correlation data D is directly divided into 4-bit blocks. Namely, 4-bit random data is restricted to a 3-bit range, providing data correlation.

Figure 3:
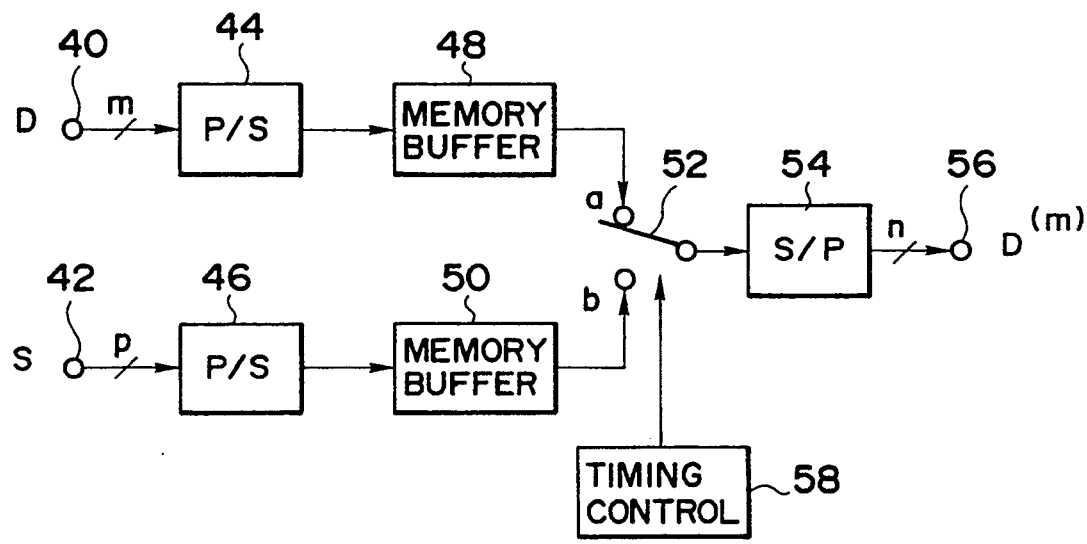
FIG. 3 is a block diagram showing an example of the circuit arrangement of the block correlation generation unit shown in FIG. 1.

FIG. 3 is a particular circuit arrangement of the block correlation generation unit 16. Reference numeral 40 represents an input terminal for a non-correlation data D, reference numeral 42 represents an input terminal for a staff data S, reference numerals 44 and 46 represent a parallel/serial (P/S) converter, reference numerals 48 and 50 represent a buffer memory, reference numeral 52 represents a switch to multiplex the output data from the buffer memories 48 and 50, reference numeral 54 represents a serial/parallel (S/P) converter, reference numeral 56 represents an output terminal, and reference numeral 58 represents a timing control circuit for controlling the switch 52.

A non-correlation data D inputted to the input terminal 40 is converted by the P/S converter 44 into a serial bit train starting from the most significant bit (MSB) of the data D. The buffer memory 48 buffers the serial bit train such that p bit space is formed every (n−p)-th bit starting from the start of the bit train. This operation corresponds to that the data D is subject to a blocking process and formed into a serial data train. The P/S converter 46 converts the staff data S inputted to the input terminal 42 into a serial data train, and the buffer memory 50 buffers the serial data train for multiplexing at the switch 52.

Under control of the timing control circuit 58, the switch 52 operates such that each p bit from the buffer memory 50 is inserted into the start p bit space and following spaces at every (n−p)-th bits of the serial data train from the buffer memory 48. The S/P converter 54 converts the bit train multiplexed by the switch 52 into a parallel signal which is outputted as the data $D^{(m)}$ from the output terminal 56.

In FIG. 4, in the case of p=1, the P/S converter 46 and buffer memory 50 may be omitted.

Figure 5:
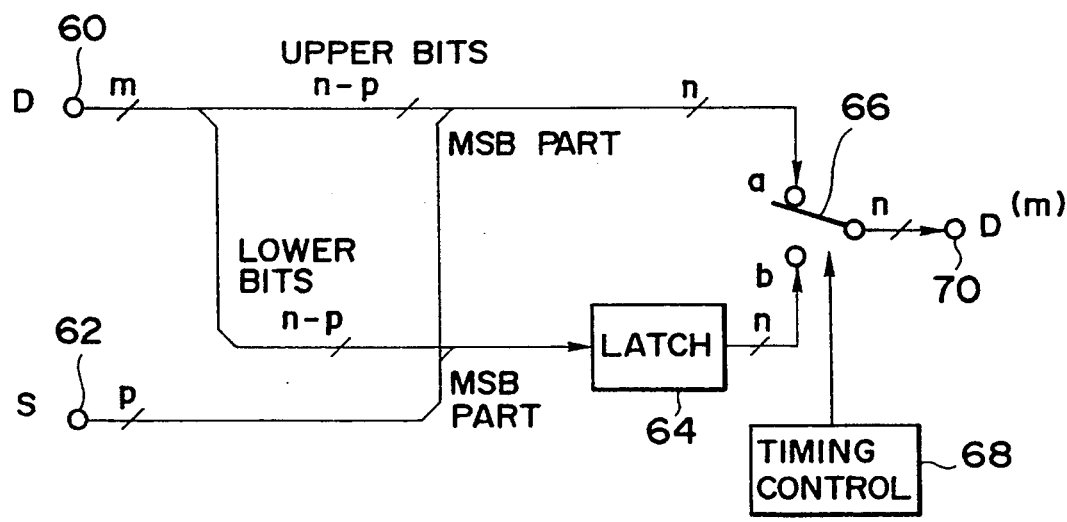
FIG. 5 is a block diagram showing another example of the circuit arrangement of the block correlation generation unit shown in FIG. 1.

FIG. 5 shows another circuit arrangement of the block correlation generation unit 16. It is assumed that n−p=m/2. Reference numeral 50 represents an input terminal for an m bit non-correlation data D, reference numeral 62 represents an input terminal for a p bit staff data S, reference numeral 64 represents a latch circuit into which the lower (n−p) bits of the m-bit non-correlation data D inputted from the input terminal 60 are placed at the upper side of the circuit, and the staff data S at the input terminal 62 is placed at the lower side thereof. Reference numeral 66 represents a selection switch. Inputted to an a contact of the selection switch 66 is an n bit data having as the lower bits the upper bits (n−p) of the non-correlation data D and as the upper bits the staff data S. Inputted to a contact b of the switch 66 is an n bit data outputted from the latch circuit 64, i.e., an n bit data having as the lower bits the lower (n−p) bits of the non-correlation data D and as the upper bits the staff data S. Reference numeral 68 represents a timing control circuit for controlling the switch 66, and reference numeral 70 represents an output terminal.

This circuit is suitable for use with a small constant m. The following description is directed to the case of m=6, p=1, and n=4 by way of example. There is supplied to the a contact of the switch 66 a 4-bit data having a 1-bit staff data S at the input terminal 62 added as the upper bit of the upper three bits of the non-correlation data D at the inputted terminal 60. There is supplied to the latch circuit 64 a 4-bit having the 1-bit staff data S at the input terminal 62 added as the upper bit of the lower three bits of the non-correlation data D. The latch circuit 64 holds its input until the timing when the switch 66 is connected to the contact b. In the above manner, a 4-bit data $D^{(m)}$ having data correlation can be outputted from the output terminal 70.

As readily understood from the foregoing description, according to this embodiment, even a code train including non-correlation data can be formed into a code train having less d.c. and low frequency components.

Figure 6:
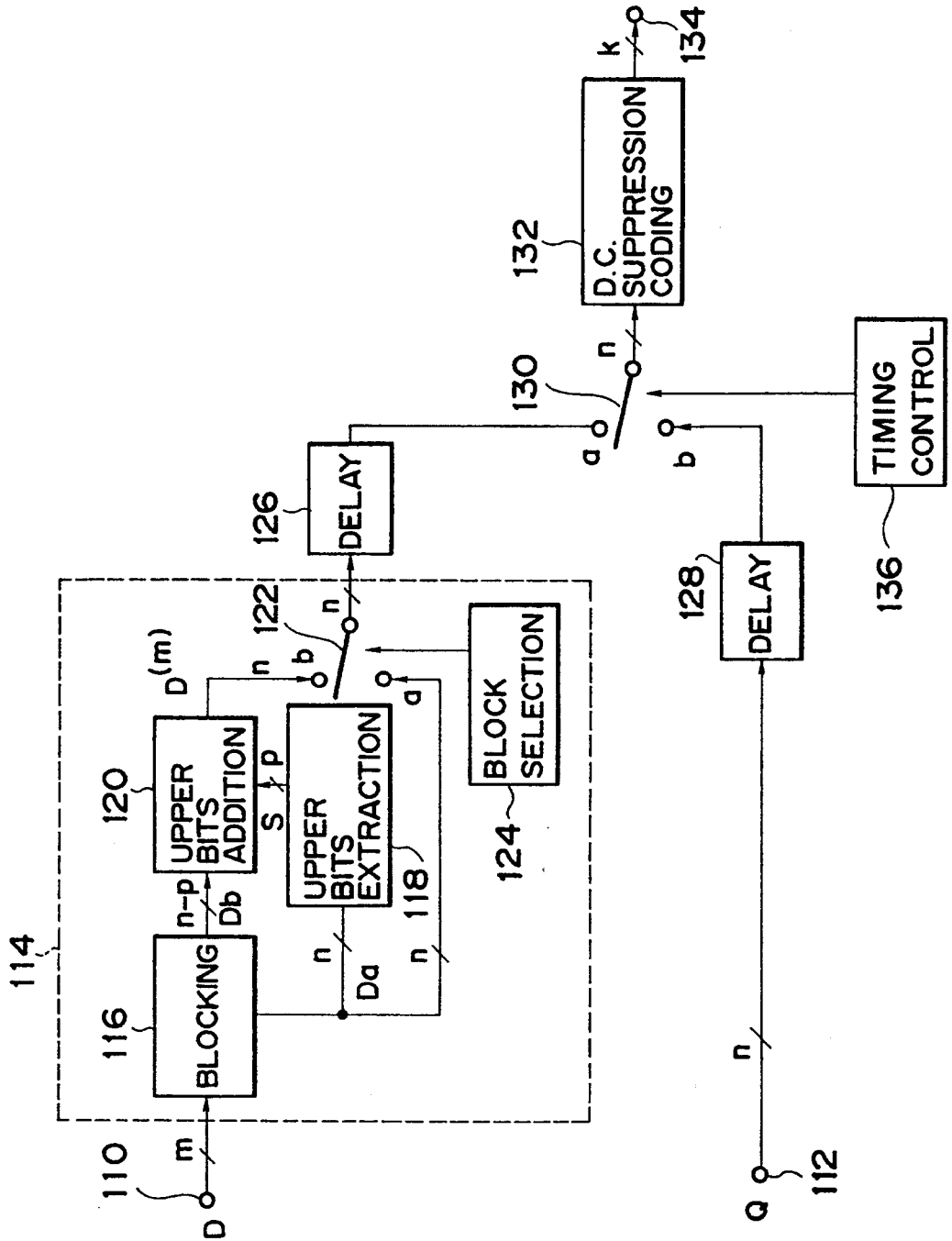
FIGS. 6 is a block diagram showing the structure of a data processing device according to another embodiment of the present invention.

FIG. 6 is a block diagram showing a data processing device according to another embodiment of the present invention. Reference numeral 110 represents an input terminal for an m bit non-correlation data D, and reference numeral 112 represents an input terminal for an n bit correlation data Q. Reference numeral 114 represents a clock correlation generation unit for converting the m-bit non-correlation data D into an n bit correlation data. In the generation unit 114, reference numeral 116 represents a blocking circuit for blocking the m-bit correlation data D into an n bit data Da and an (n−p)-bit data Db. Reference numeral 118 represents an upper bit extraction circuit for extracting the upper bit of the n-bit data Da, reference numeral 120 represents an upper bit addition circuit for adding a data S extracted by the upper bit extraction circuit 118 as the upper bit of the data Db, reference numeral 122 represents a switch for selectively outputting either the data Da or an output of the upper bit addition circuit 120, and reference numeral 24 represents a block selection circuit for controlling the switch 122.

Reference numerals 126 and 128 represent a delay circuit for timing adjustment, reference numeral 130 represents a switch as a multiplexing circuit, reference numeral 132 represents a d.c. suppression coding circuit, reference numeral 134 represents an output terminal, and reference numeral 136 represents a timing control circuit for controlling the switch 130.

The operation of the data processing device shown in FIG. 6 will be described. The blocking circuit 116 blocks the non-correlation data D at the input terminal 110 into an n bit data Da and (n−p)-bit data Db. The relationship between the data Da and data Db will be later described. The upper bit extraction circuit 118 extracts the upper p-bit of the data Da and supplies it as the staff data S to the upper bit addition circuit 120. The upper bit addition circuit 120 adds the staff data S as the upper bit of the data Db from the blocking circuit 116, to thereby obtain an n-bit data. Under control of the block selection circuit 124, the switch 122 selects either the data Da or an output data from the upper bit addition circuit 120, as will be later described. An output of the switch 122, i.e., an output of the block correlation generation unit 114, is an n bit blocked data $D^{(m)}$ having data correlation.

An output of the block correlation generation unit 114 and the input data at the input terminal 112 are delayed by the delay circuits 126 and 128, respectively, and supplied to a and b contacts of the switch 130. The switch 130 is actuated by a timing signal from the timing control circuit 136, so that the data $D^{(m)}$ and Q are inputted to the d.c. suppression coding circuit 132 in the order, e.g. as shown in FIG. 4.

A series of n bit data inputted to the d.c. suppression coding circuit 132 has data correlation therebetween. The d.c. suppression coding circuit 132 encodes a series of n-bit data $D^{(m)}$ and Q multiplexed by the switch 130 into a k-bit code having less d.c. and low frequency components, in accordance with an 8—8 word invert coding method of suppressing d.c. and lower frequency components, and outputs it from the output terminal 130.

Figure 7:
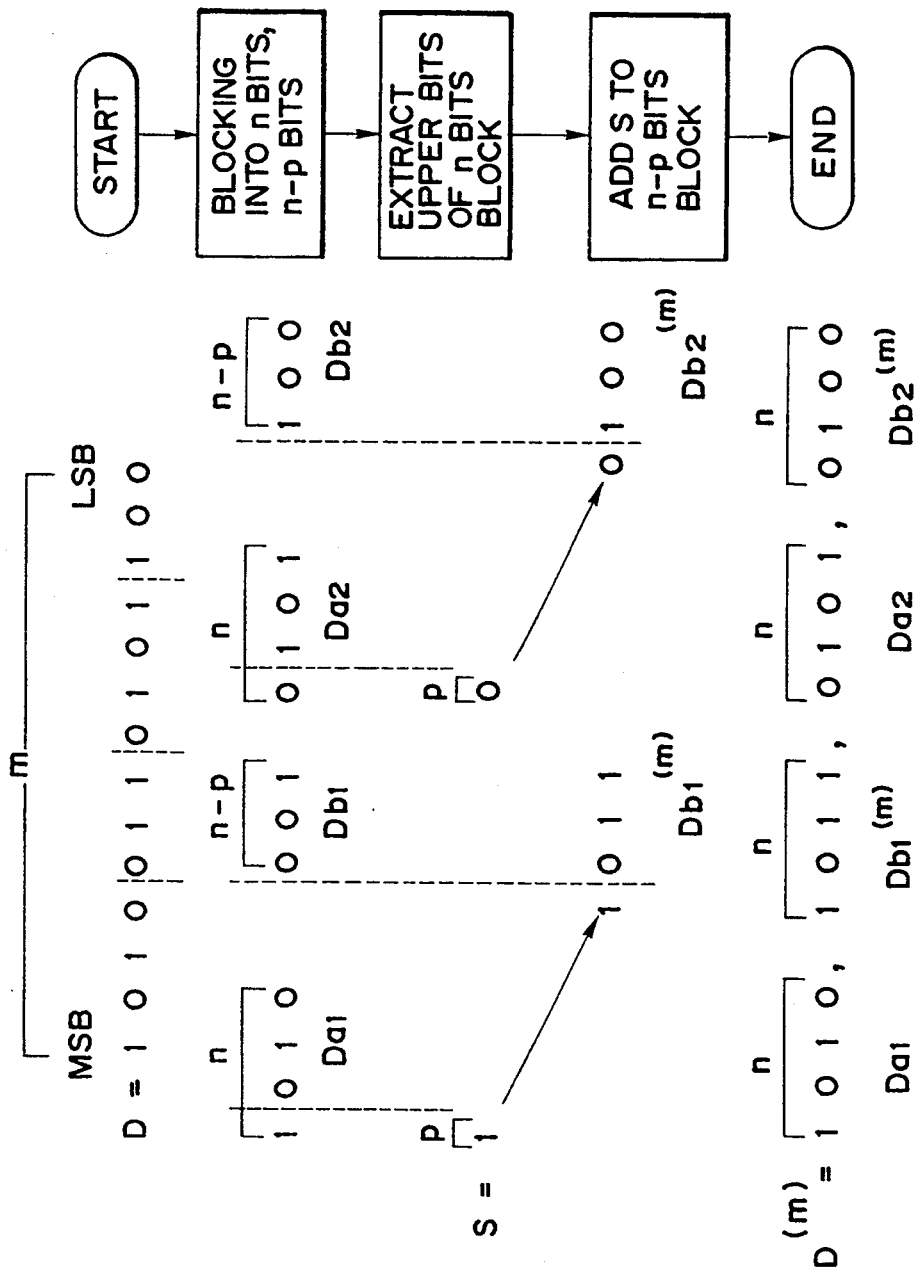
FIGS. 7 and 8 are diagrams used for explaining the processing contents of the block correlation generation unit shown in FIG. 6.

Next, the method of determining the staff data S will be described with reference to FIG. 7. FIG. 7 shows an example of the processing flow and contents of the correlation generation unit 114. In this example, m=14, n=4, and p=1. The d.c. suppression coding circuit 132 generates a k (=2n) bit code using correlation between two adjacent n-bit data. The blocking circuit 116 blocks the non-correlation data D alternately into an n-bit data Da and (n−p)-bit data Db, in the order of bits of the data D. The upper p-bit of the data Da is extracted as the staff data S which is then added as the upper bit of the succeeding data Db. In this manner, an output of the upper bit addition circuit 120 becomes equal to the upper bit of the advancing data Da, thereby providing an n-bit data having data correlation. The switch 122 is activated every n-th bit by the block selection circuit 124 to alternately select the data Da or an output of the upper bit addition circuit 120.

An output $D^{(m)}$ from the switch 122 has correlation between two adjacent n-bit data. Therefore, by encoding it into a k (=2n) bit code through d.c. suppression encoding, it is possible to generate a code having less d.c. and low frequency components. In FIG. 7, the non-correlation data D is blocked into Da and Db in this order starting from MSB. This order may be reversed. A combination of data Da and Db is not limited to the example shown in FIG. 7, but may be determined in accordance with correlation used at the d.c. suppression coding circuit 132.

Figure 8:
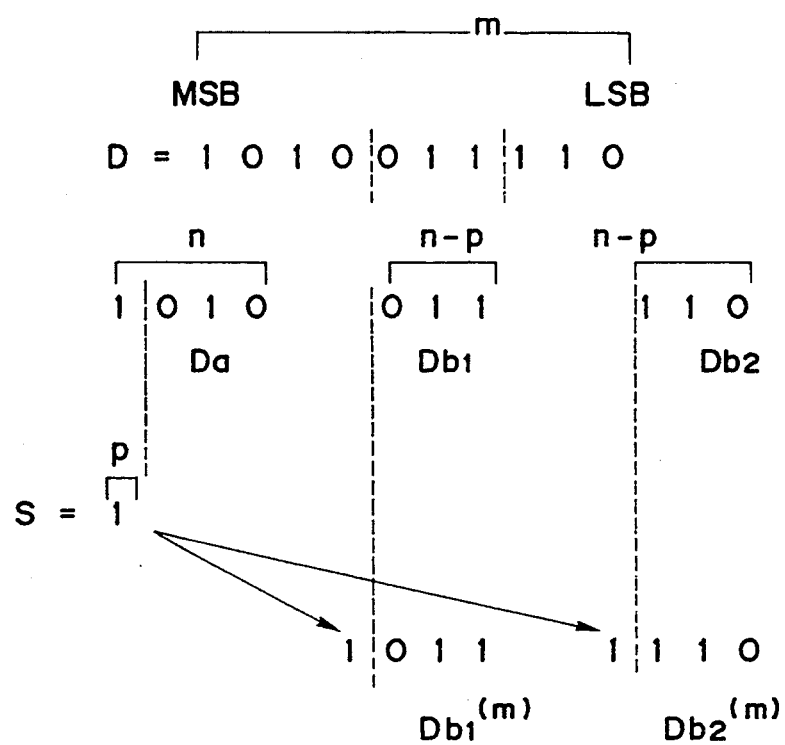

FIG. 8 shows a particular example wherein the d.c. suppression coding circuit 132 uses correlation between three adjacent n bit data. In this case, k=3n, m=10, n=4, and p=1. The blocking circuit 116 blocks the non-correlation data D into an n-bit data Da, and two (n−p)-bit data Db1 and Db2. The upper p-bit of the data Da is extracted as the staff data S, and added as the upper bit of the data Db1 and Db2. Therefore, the data $Db1^{(m)}$ and $Db2^{(m)}$ obtained from the data Db1 and Db2 added with the staff data S as the upper bits, i.e., an output of the upper bit addition circuit 120, has correlation between n-bit data because they has the same upper bit p as that of the advancing data Da. The switch 122 sequentially selects Da, $Db1^{(m)}$ and $Db2^{(m)}$. An output $D^{(m)}$ from the switch 122 has correlation between three adjacent n-bit data Da, $Db1^{(m)}$ and $Db2^{(m)}$ so that it is possible to generate a k−(=3n) bit code having less d.c. and low frequency components by means of d.c. suppression coding.

Figure 9:
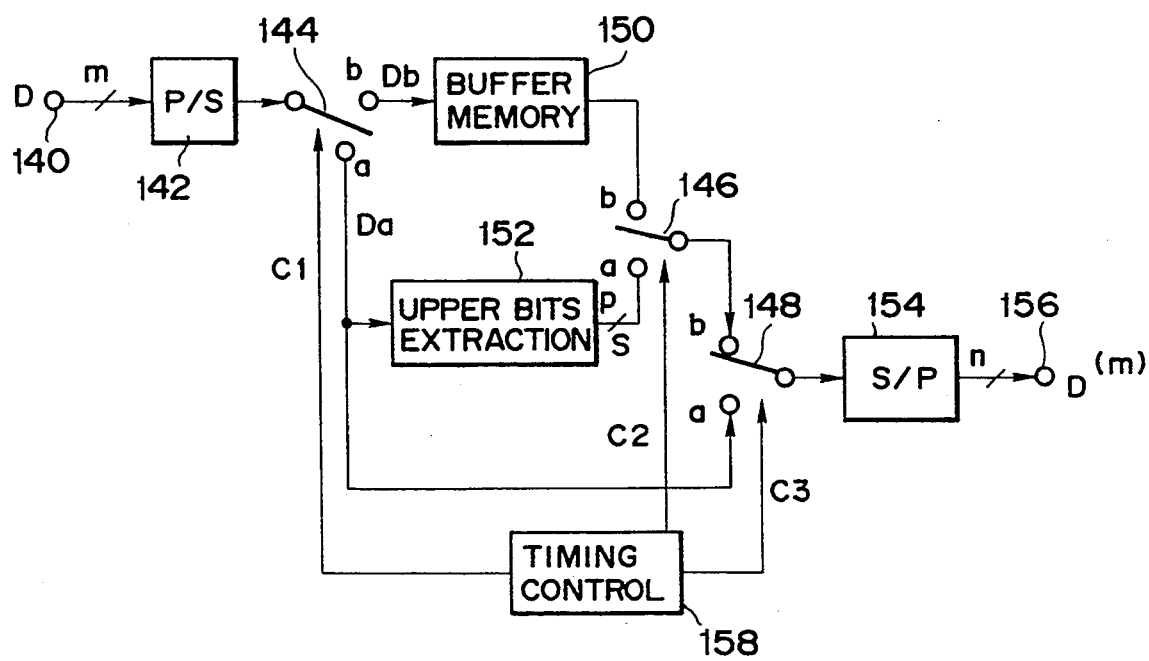
FIG. 9 is a block diagram showing the circuit arrangement of the block correlation generation unit shown in FIG. 6.

FIG. 9 is a particular circuit arrangement of the block correlation generation unit 114. Reference numeral 140 represents an input terminal for a non-correlation data D, reference numeral 142 represents a parallel/serial (P/S) converter, reference numerals 144, 146, and 148 represent a switch, reference numeral 150 represents a buffer memory, reference numeral 152 represents an upper bit extraction circuit, reference numeral 156 represents an output terminal, and reference numeral 158 represents a timing control circuit for controlling the switches 144, 146 and 148.

Figure 10:
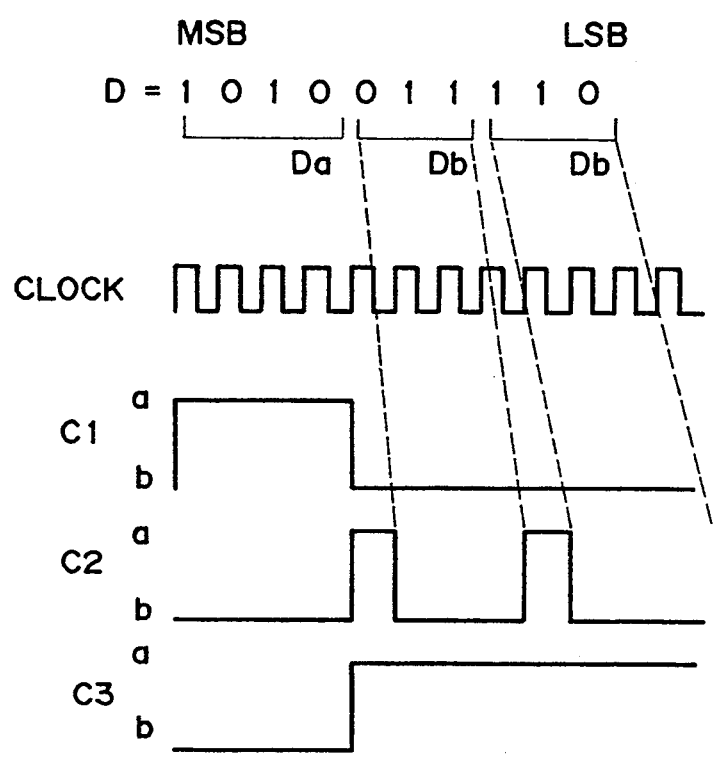
FIG. 10 is a timing chart used for explaining the switching timings of the switch shown in FIG. 9

A non-correlation data D inputted to the input terminal 140 is converted by the P/S converter 144 into a serial bit train starting from the most significant bit (MSB) of the data D. The switch 144 operates in response to a control signal C1 from the timing control circuit 158 so that the data Da is supplied to a contact a, and the data Db is supplied to a contact b. The switching timings for the example of FIG. 8 are shown in FIG. 10. The upper bit extraction circuit 152 extracts the upper bit p of the data Da and holds it as the staff data S. The buffer memory 150 buffers the data Db1 and Db2 for adding the staff data S upon operation of the switch 146. The switch 146 operates at the timing of a control signal C2 shown in FIG. 10 to add the staff data S as the upper bit of the data Db1 and Db2. The switch 148 operates at the timing of a control signal C3 shown in FIG. 10 to multiplex the data Da at the contact a of the switch 144 with the data Db1$^{(m)}$ and Db2$^{(m)}$ having the staff data S added. The S/P converter 154 converts the bit train multiplexed by the switch 148 into a parallel signal which is outputted as a D$^{(m)}$ from the output terminal 156.

Figure 11:
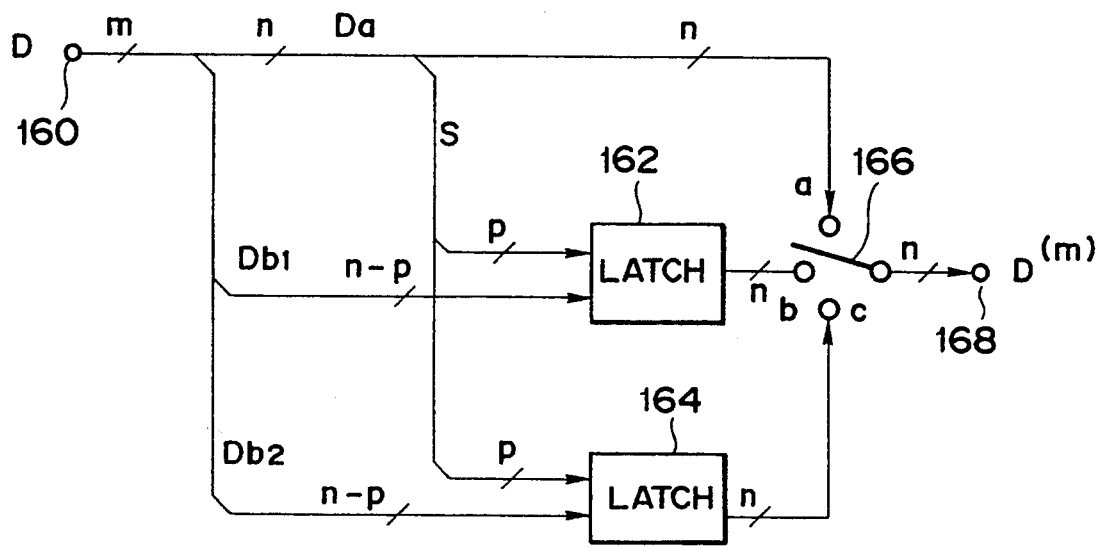
FIG. 11 is a block diagram showing another example of the circuit arrangement of the block correlation generation unit shown in FIG. 6.
Figure 11:
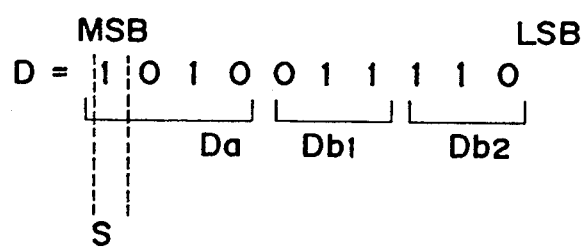

FIG. 11 shows another circuit arrangement of the block correlation generation unit 114. Reference numeral 160 represents an input terminal for an m-bit non-correlation data D, reference numerals 162 and 164 represent an n-bit latch circuit, reference numeral 166 represents a switch, and reference numeral 168 represents an output terminal. This circuit is applicable to the case of a constant m not having a large value. It is assumed here that m=10, p=1 and n=4.

The upper n bit of the non-correlation data D inputted to the input terminal 160 is supplied to the contact a of the switch 166, and the following (n−p) bits of the data D are supplied as Db1 and Db2 to the upper portions of the latch circuits 162 and 164. The latch circuits 162 and 164 hold data Db1$^{(m)}$ and Db2$^{(m)}$ obtained from the data Db1 and Db2 added with the upper bit staff data S, respectively. The data Db1$^{(m)}$ and Db2$^{(m)}$ are supplied to the contacts b and c of the switch 166 whose contacts are selected in the order of a, b and c. In this manner, the data D$^{(m)}$ shown in FIG. 8 is obtained and outputted from the output terminal 168.

As readily understood from the foregoing description, according to the embodiments shown in FIGS. 6 to 11, even a code train including non-correlation data can be formed into a code train having less d.c. and low frequency components through d.c. and low frequency suppression coding by using data correlation, while providing a smaller redundancy.

What is claimed is:

1. A data processing device, comprising:
   (a) input means for inputting a plurality of non-correlation data having no correlation between data, said plurality of non-correlation data each being constructed of an (n−p) bit where n is an integer equal to or more than 2 and p is an integer smaller than n;
   (b) means for adding a common p-bit data to each of said plurality of non-correlation data; and
   (c) means for processing a plurality of n-bit data outputted from said adding means, using correlation between said plurality of n-bit data.

2. A device according to claim 1, wherein said processing means includes a coding circuit for suppressing d.c. components of said plurality of n-bit data.

3. A device according to claim 1, wherein said adding means includes a first buffer to which said plurality of non-correlation data are inputted, a second buffer to which said common p-bit data is inputted, and switching means for selectively picking up on a one bit unit basis either an output of said first buffer or an output of said second buffer.

4. A device according to claim 1, wherein said input means blocks an i(n−p)-bit data into (n−p)-bit unit data, said i(n−p)-bit data to be blocked being inputted as said plurality of non-correlation data, wherein i is an integer more than 2.

5. A device according to claim 4, wherein said adding means includes a latch for relatively delaying said i(n−p)-bit data.

6. A device according to claim 1, further comprising: means for inputting a plurality of n-bit correlation data having correlation between data; and switching means for selectively outputting either said plurality of n-bit correlation data or a plurality of n-bit data outputted from said adding means.

7. A data processing device, comprising:
   (a) first input means for inputting a plurality of non-correlation data having no correlation between data, said plurality of non-correlation data each being constructed of an (n−p) bit where n is an integer equal to or more than 2 and p is an integer smaller than n;
   (b) means for adding a common p-bit data to each of said plurality of non-correlation data;
   (c) second input means for inputting a plurality of n-bit correlation data having correlation between data; and
   (d) switching means for selectively outputting either said plurality of n-bit correlation data or a plurality of n-bit data outputted from said adding means.

8. A device according to claim 7, further comprising means for processing a plurality of n-bit data outputted from said switching means, using correlation between said plurality of n-bit data.

9. A device according to claim 8, wherein said processing means includes a coding circuit for suppressing d.c. components of said plurality of n-bit data.

10. A device according to claim 7, further comprising means for controlling the timings between said plurality of n-bit correlation data and a plurality of n-bit data outputted from said adding means.

11. A data processing device, comprising:
    (a) input means for inputting a plurality of non-correlation data having no correlation between data, said plurality of non-correlation data each being constructed of an i(n−p) bit where n and i are an integer equal to or more than 2 and p is an integer smaller than n;
    (b) means for blocking said i(n−p)-bit data into an (n−p)-bit unit data; and
    (c) means for adding a common p-bit data to each of said (n−p)-bit data from said blocking means.

12. A device according to claim 11, further comprising means for processing a plurality of n-bit data outputted from said adding means, using correlation between said plurality of n-bit data.

13. A data processing device, comprising:
    (a) input means for inputting a plurality of non-correlation data having no correlation between data, said plurality of non-correlation data each being constructed of an m bit where m is an integer;
    (b) means for separating said plurality of m-bit non-correlation data into a plurality of blocks including (n−p)-bit data and n-bit data, where n and m are an integer equal to or more than 2 and p is an integer smaller than n; and
    (c) means for adding p bit among said n-bit data separated by said separating means to said (n−p)-bit data separated by said separating means.

14. A device according to claim 13, further comprising means for processing a plurality of n-bit data outputted from said adding means, using correlation between said plurality of n-bit data.

15. A device according to claim 14, wherein said processing means includes a coding circuit for suppressing d.c. components of said plurality of n-bit data.

16. A device according to claim 13, wherein said p bit added by said adding means is an upper p bit among said n-bit data separated by said separating means.

17. A device according to claim 13, further comprising: means for inputting a plurality of n-bit correlation data having correlation between data, and switching means for selectively outputting either said plurality of n-bit correlation data or a plurality of n-bit data outputted from said adding means.

* * * * *

UNITED STATES PATENT AND TRADEMARK OFFICE
CERTIFICATE OF CORRECTION

PATENT NO. : 5,361,066
DATED : November 1, 1994
INVENTOR(S) : Yoshiki Ishii

It is certified that error appears in the above-indentified patent and that said Letters Patent is hereby corrected as shown below:

On the Title page, Item

[56] References Cited

U.S. Patent Documents, "4,456,905   6/7198 Odaka" should read --4,456,905   6/1984 Odaka--; and "Skikakura et al." should read --Shikakura et al.--.

COLUMN 2

Line 63, "blocks" should read --blocks,--.

COLUMN 6

Line 35, "has" should read --have--.

Signed and Sealed this

Thirty-first Day of October 1995

Attest:

BRUCE LEHMAN

Attesting Officer    Commissioner of Patents and Trademarks